United States Patent
Bansal

(10) Patent No.: US 10,506,022 B2
(45) Date of Patent: Dec. 10, 2019

(54) CONFIGURATION CHANGE REALIZATION ASSESSMENT AND TIMELINE BUILDER

(71) Applicant: Nicira, Inc., Palo Alto, CA (US)

(72) Inventor: Kaushal Bansal, Pleasanton, CA (US)

(73) Assignee: Nicira, Inc., Palo Alto, CA (US)

( * ) Notice: Subject to any disclaimer, the term of this patent is extended or adjusted under 35 U.S.C. 154(b) by 424 days.

(21) Appl. No.: 15/134,291

(22) Filed: Apr. 20, 2016

(65) Prior Publication Data
US 2017/0310738 A1 Oct. 26, 2017

(51) Int. Cl.
*H04L 29/08* (2006.01)
*H04L 29/06* (2006.01)
*H04L 12/24* (2006.01)
*G06F 8/654* (2018.01)
*G06F 9/455* (2018.01)

(52) U.S. Cl.
CPC .......... *H04L 67/10* (2013.01); *H04L 63/0218* (2013.01); *H04L 63/0263* (2013.01); *H04L 63/04* (2013.01); *H04L 63/1425* (2013.01); *G06F 8/654* (2018.02); *G06F 9/45558* (2013.01); *G06F 2009/45587* (2013.01); *H04L 41/06* (2013.01); *H04L 63/0442* (2013.01); *H04L 63/101* (2013.01)

(58) Field of Classification Search
CPC ....... G06F 8/65; H04L 41/069; H04L 41/082; H04L 41/0873; H04L 67/34
See application file for complete search history.

(56) References Cited

U.S. PATENT DOCUMENTS

| | | | | |
|---|---|---|---|---|
| 2005/0015471 | A1* | 1/2005 | Zhang | H04L 63/0442 709/221 |
| 2007/0143842 | A1* | 6/2007 | Turner | G06F 21/552 726/22 |
| 2012/0005542 | A1* | 1/2012 | Petersen | G06F 11/0709 714/48 |
| 2012/0246303 | A1* | 9/2012 | Petersen | G06F 17/30144 709/224 |
| 2015/0113121 | A1* | 4/2015 | Redal Pena | H04L 41/0681 709/224 |
| 2016/0294614 | A1* | 10/2016 | Searle | G06F 8/654 |

* cited by examiner

*Primary Examiner* — Barbara B Anyan
(74) *Attorney, Agent, or Firm* — Patterson + Sheridan, LLP

(57) ABSTRACT

Techniques disclosed herein provide an approach for assessing configuration change realization and building timelines. In one embodiment, an event parser parses relevant log(s) of a computing system to identify events of interest therein and associated tasks. Examples of tasks include publishing a firewall or persisting a firewall rule, each of which may involve multiple events in a particular order. Upon identifying an initial event of a task, the event parser instantiates a state machine associated with the task to verify the occurrence of subsequent events in the task in the appropriate order. The event parser may verify whether configuration changes made by a user have been realized in the system based on the completion of tasks associated with the configuration changes. In addition, data associated with tasks may be persisted in a datastore and used to generate reports.

20 Claims, 4 Drawing Sheets

A

B

CONFIGURATION CHANGE REALIZATION ASSESSMENT AND TIMELINE BUILDER

BACKGROUND

Virtualization software enables multiple virtual machines to be executed on a single hardware computing platform and manages the allocation of computing resources to each virtual machine (VM). A set of hardware computing platforms can be organized as a server cluster to provide computing resources for a data center. In a virtualized environment, configuration changes made by a user, such as publishing a logical firewall or persisting a firewall rule, may be propagated to virtualization software in multiple computing platforms and enforced therein. Traditionally, there have not been any tools for identifying whether a user-defined configuration change has actually been realized on multiple computing platforms in a virtualized environment, or how long it takes to realize such configuration changes.

SUMMARY

One embodiment provides a method of assessing configuration change realization in a datacenter. The method generally includes parsing log messages received from a plurality of computing systems of the datacenter. The method further includes identifying from the parsing of the log messages a first event, the first event being associated with a task that corresponds with a configuration change being made to one or more of the computing systems, and the task including predefined subsequent events that are expected to occur after the first event. In addition, the method includes identifying from the parsing each of the subsequent events of the task, and when each of the subsequent events of the task are identified from the parsing of the log messages, generating a report which indicates a realization of the configuration change associated with the task.

Further embodiments include a non-transitory computer-readable storage medium storing instructions that when executed by a computer system cause the computer system to perform the method set forth above, and a computer system programmed to carry out the method set forth above.

DETAILED DESCRIPTION

Embodiments presented herein provide techniques for assessing configuration change realization and building timelines. In one embodiment, an event parser parses log(s) of a computing system to identify events of interest therein associated with tasks. As used herein, an event refers to a log message generated at a particular time, and a task refers to a collection of events in a particular order associated with system actions undertaken to realize a corresponding configuration change. Examples of tasks include publishing a firewall or persisting a firewall rule, each of which may include a number of events in a particular order. Upon identifying an initial event of a task, the event parser instantiates a state machine associated with the task to verify the occurrence of subsequent events in the task in the particular order. That is, the event parser identifies logs messages which relate to events in the state machine and further identifies whether the events are traversed in a manner in which the state machine may be executed to determine if the task is completed or not. The event parser is able to verify whether configuration changes made by a user have been realized in the system based on the completion of tasks associated with the configuration changes. In addition, data associated with the tasks may be gathered, such as timestamp data, runtime values of variables, and the like, which are then persisted in a datastore and used to generate reports displayed to a user via a user interface (UI).

Although configuration changes to a logical firewall in a virtualized computing system are used herein as a reference example, techniques disclosed herein are not limited to logical firewalls and may generally be applied to assess configuration change realization and build timelines for configuration changes being made in any appropriate physical or virtualized computing system.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

Figure 1:
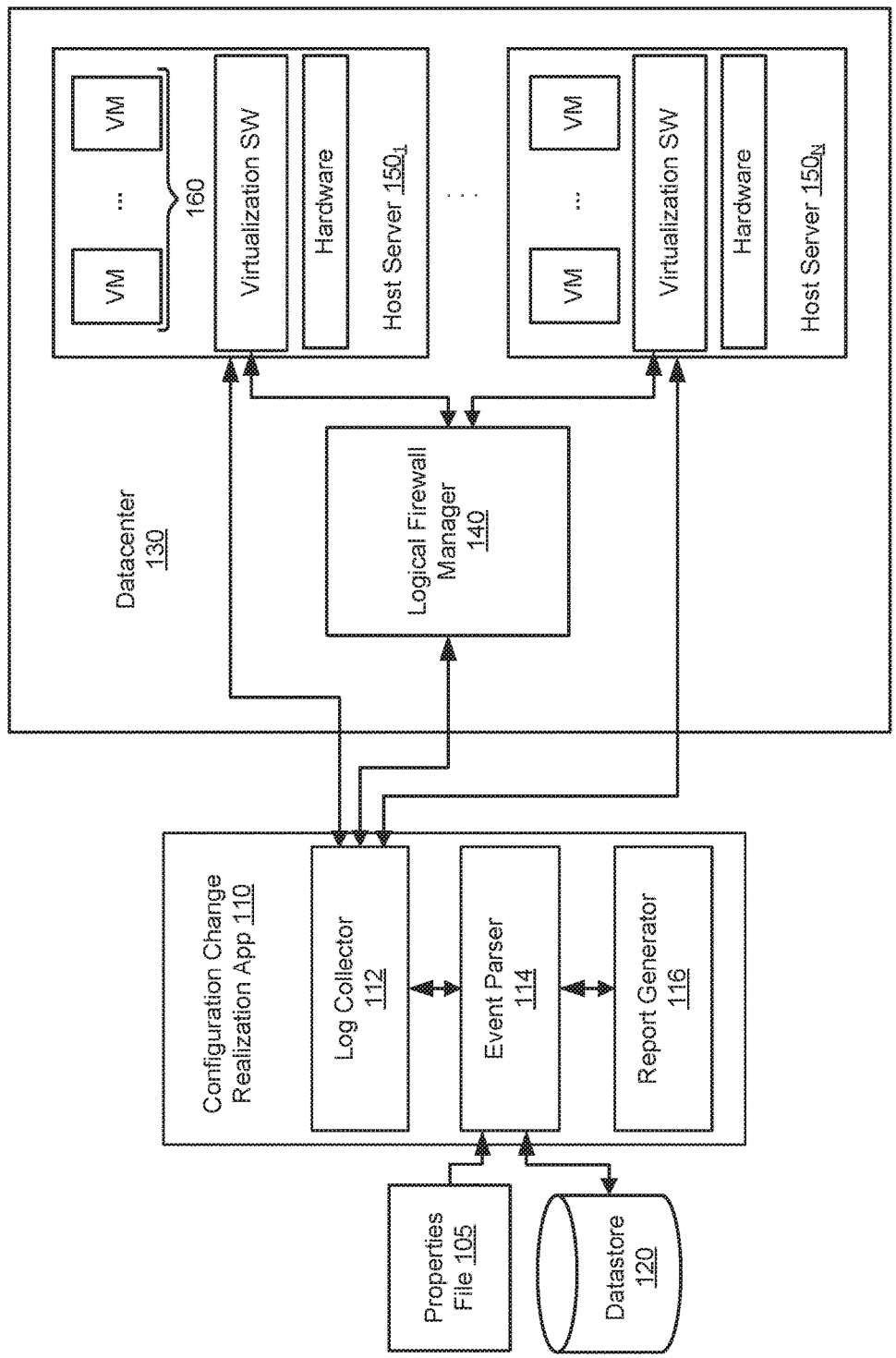
FIG. 1 illustrates an approach for collecting log information and generating configuration change realization and timeline reports, according to an embodiment.

FIG. 1 illustrates an approach for collecting log information and generating configuration change realization and timeline reports, according to an embodiment. As shown, a configuration change realization assessment application 110, which includes a log collector 112, an event parser 114, and a report generator 116, is in communication with host servers $150_{1-N}$ and logical firewall manager application 140 in a datacenter 130. Although shown as separate from datacenter 130, it should be understood that configuration change realization assessment application 110 may generally run in any computer, including one of the computers in datacenter 130. Illustratively, datacenter 130 is a virtualized datacenter that includes a plurality of host servers $150_{1-N}$ running virtualization software layers (e.g., hypervisors) that abstract processor, memory, storage, and/or networking resources into multiple virtual machines (e.g., VMs) that can be concurrently executed on the physical host servers $150_{1-N}$.

Host servers $150_{1-N}$ may be constructed on conventional hardware platforms, each including a central processing unit (CPU) that retrieves and executes programming instructions stored in a memory and also stores and retrieves application data residing in memory, network interface controllers connecting the server to network(s), and I/O device interface(s), among other things. As discussed, each virtualization software layer, referred to hereinafter as the "hypervisor," abstracts host server resources into multiple virtual machines (e.g., VMs 160) that run side-by-side on the same physical host server. That is, the hypervisor partitions host servers $150_{1-N}$ into multiple secure and portable virtual machines that run on the same physical servers. Each VM represents a complete system—with processors, memory, networking, storage, and/or BIOS. Each VM also includes a software-based virtual network adapter (VNIC) that is logically connected to one or more physical network adapters via a virtual switch, which may be a distributed virtual switch in one embodiment. A guest operating system (OS) executes in each VM and uses the corresponding VNIC to send packets to and receive packets from the virtual switch.

Logical firewall manager application 140, which may run in a management server (not shown) or alternatively in one of the host servers $150_{1-N}$ (e.g., in a VM), provides a management plane via which network security may be configured, including publishing a logical firewall distributed across host servers $150_{1-N}$ in datacenter 130 and persisting firewall rules. For example, logical firewall manager application 140 may expose an application programming interface (API) and/or provide a UI which can be used to publish the logical firewall or persist the firewall rule. In one embodiment, firewall manager application 140 manages a logical firewall of a single datacenter 130. Although shown for simplicity as a single application, logical firewall manager may be implemented as a cluster of manager applications for increased scalability and redundancy. Additionally, multiple firewall manager applications or clusters may operate together to provide a logical firewall that stretches across datacenters, with a firewall manager application in one datacenter being designated as a primary firewall manager and firewall rules being replicated from the primary firewall manager to secondary firewall managers in other datacenters. In a particular embodiment, logical firewall manager 140 may be incorporated into a logical overlay network manager such as NSX® Manager™, which is commercially available from VMware, Inc. of Palo Alto, Calif.

When a configuration change (e.g., publishing a logical firewall or persisting a firewall rule) is made via logical firewall manager application 140, the configuration change is pushed down to the data plane that includes host servers $150_{1-N}$ (in the single datacenter 130 or, alternatively, hosts in multiple datacenters). In response, the virtualization software (e.g., hypervisors) running in host servers $150_{1-N}$ program data paths, such as VM VNICs or virtual interfaces therefore (not shown), to enforce the configuration change that has been pushed down. In one embodiment, a user is permitted to configure firewall rules for objects including host clusters, datacenters, distributed virtual switch port groups, logical switches, IPSets, resource pools, logical containers (also referred to herein as "VM containers") with one or more VMs associated with the containers via tags and rules that are applied to each container being propagated to VMs having that container's tag, individual VMs, VNICs, Security Groups, and the like. In turn, logical firewall manager 140 may convert the object specified by the user into associated VM IP addresses or MAC addresses, and push the firewall rules down to hypervisors running in host servers $150_{1-N}$ so that the rules can be enforced at the appropriate VMs' VNICs, i.e., enforced at the data path level. For example, the user may create a firewall rule to detect and allow traffic from a server and specify that the rule is to be applied to a logical network, and, in turn, the rule may be distributed to all hypervisors where the logical network exists and enforced on all VNICs that are part of or connected to the logical network. Further, such realization of the user-specified firewall rule may be performed in background thread(s) of logical firewall manager 140 and the hypervisors, with the multiple entities working in concert to implement the rule, so that the user is not aware of whether the rule (s)he created has been realized in the data plane.

Returning to configuration change realization assessment application 110, log collector 112 is configured to collect logs from host servers $150_{1-N}$ and logical firewall manager application 140. Where the logical firewall stretches across datacenters, log collector 112 may collect logs from logs and logical firewall manager applications in multiple datacenters. In one embodiment, the logs collected from host servers $150_{1-N}$ and firewall manager application 140 are logs that record user operation events and events associated with system threads. The logs may be created in any feasible manner, including using well-known logging techniques. It should be understood that the information collected in such logs may depend on the type of host servers $150_{1-N}$ and applications running therein. In a particular embodiment, log collector 112 may be a standard "syslog" collector that collects logs from host servers $150_{1-N}$ and logical firewall manager application 140.

Event parser 114 is configured to parse relevant logs collected by log collector 112 and identify events of interest in the log entries. The events of interest may be identified from the log entries via pattern matching based on a predefined set of matching rules. Event parser 114 may further attach a timestamp from the corresponding log message to each identified event and persist the event or interesting event attributes in a datastore 120 which may be, e.g., a relational or a key-value database.

In addition to identifying events, event parser 114 is also responsible for determining whether tasks comprising multiple events have been completed. Examples of such tasks include publishing a logical firewall or persisting a firewall rule, each of which is discussed in greater detail below and involves a number of events occurring in a particular order. As shown, the events and ordering of events in each task are statically defined in a properties file 105 that is provided by a user and that event parser 114 takes as input. Although discussed herein primarily with respect to properties file 105, it should be understood that the events and ordering of events may instead be inherent to event parser 114, or taken as input in a manner other than through properties file 105. Having the events and ordering of events be inherent to event parser 114 is more limiting than an approach in which the events and ordering are specified in user input, such as through properties file 105.

As discussed in greater detail below, upon identifying an initial event for a task, event parser 114 instantiates a state machine associated with the task to verify the occurrence of subsequent events in the task in the appropriate order, as specified in properties file 105. As a result, event parser 114 is able to determine whether configuration changes made in the management plane (logical firewall manager 140) have been realized in the data plane (host servers $150_{1-N}$). Data associated with each task, including whether the task has been completed and the time taken to complete the task, may be stored in datastore 120 (or in a separate datastore). In addition, the specific information provided in logs messages (e.g., timestamps, runtime values of variables, etc.) may also be persisted and used to correlate identified events and tasks with configuration changes made by a user in the management plane to determine whether those changes have been realized in the data plane. For example, a firewall publish task may be associated with log messages specifying the section(s) which have been updated and hypervisors where rules have been propagated, as well as generation number(s) representing specific updates of the section(s) at specific time(s), and such log message information may be used to determine whether the firewall publishing has been realize through the appropriate updating of sections, propagating of rules to hypervisors, etc.

Report generator engine 116 is configured to generate, based on the events and task data persisted in datastore 120, reports that may be presented via a user interface. The generated reports may indicate, for example, whether particular configuration changes corresponding to identified tasks have been realized, the amount of time taken to realize particular configuration changes, timelines of events and other details of the configuration change realization, and the like.

Figure 2:
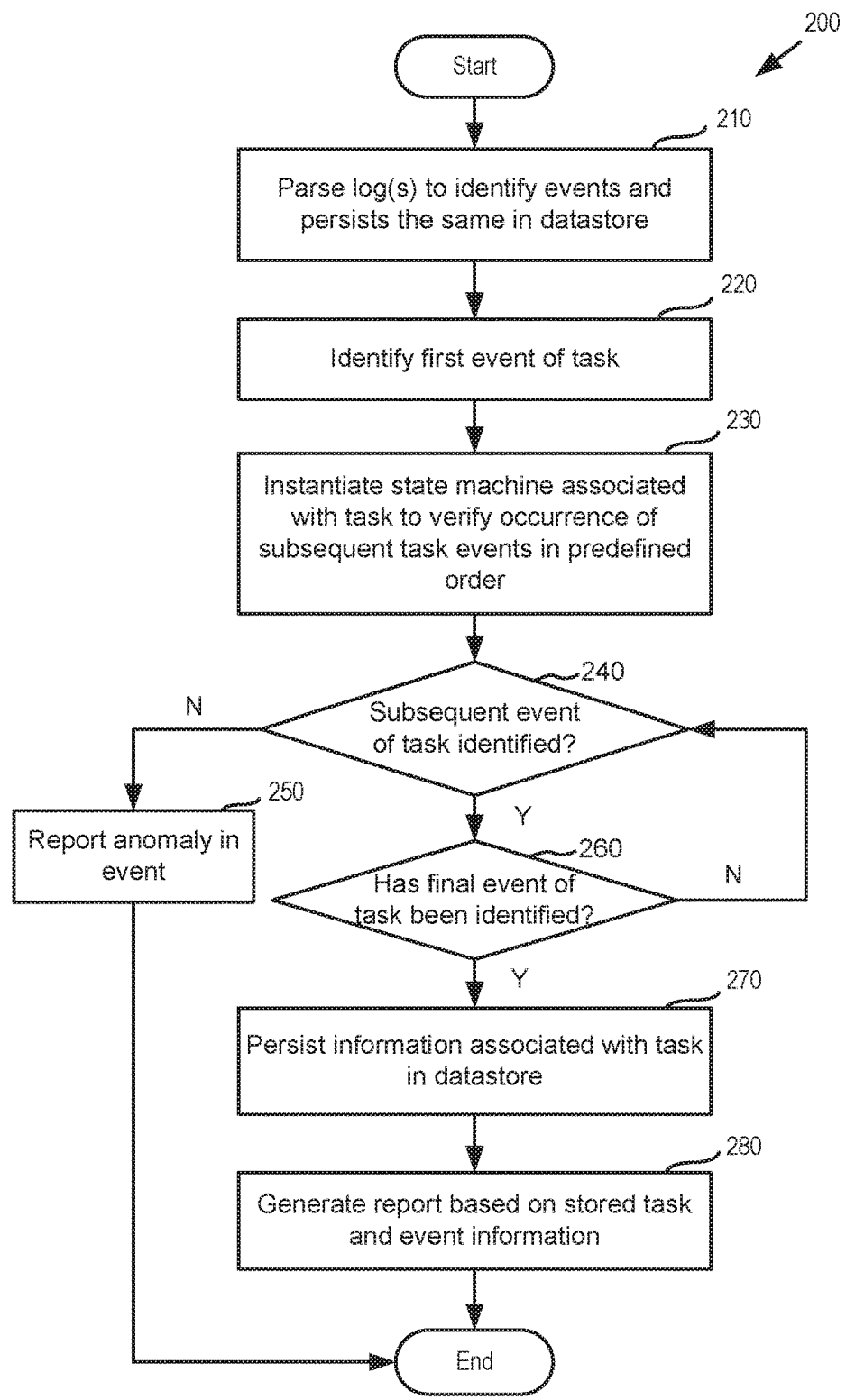
FIG. 2 illustrates a method of assessing configuration change realization, according to an embodiment.

FIG. 2 illustrates a method 200 of assessing configuration change realization, according to an embodiment. As shown, method 200 begins at step 210, where event parser 114 parses log(s) to identify events of interest and persists the same in datastore 120. As discussed, events of interest may be identified by pattern matching log entries to the events in tasks, based on predefined rules, and event parser 114 may further attach a timestamp from the corresponding log message to each identified event and persist the same in datastore 120. For example, log entries may be matched to events of interest based on context, file name of the log in which the message is found, data that has been printed in the log message, among other things. The log messages themselves, represented as events by event parser 114, may include attributes such as timestamps indicating run time values of parameters, the numbers of rules, types of rule, generation numbers, etc., and any such attribute or combination of attributes may be used to match log entries to events of interest. Attributes of interest, such as those needed to generate desired reports, may also be persisted in datastore 120. All other log entries that do not match to events of interest may be discarded, or alternatively stored as anonymous events in a separate datastore.

At step 220, event parser 114 identifies a first event of a task. Although one task is shown as an example, it should be understood that steps 220-260 may generally be repeated for any number of tasks. As discussed, each task may include multiple events occurring in a particular order. Upon identifying a first task event at step 220, event parser 114 instantiates a state machine associated with the task at step 230 to verify the occurrence of subsequent events in the task in the appropriate order.

For example, publishing a logical firewall may be associated with a task which is divided into the following events: publish begins for a particular span, fetch rules from a persistent datastore, compute IP list for logical VM containers and used in Layer 3 (L3) rules, compute MAC list for VM containers used in Ethernet or L3 rules, compute VNIC list for VM containers applied to fields in both L3 and Layer 2 (L2) rules, convert to a message format agreed upon between the management plane and the control plane for transmission to host clusters, place the message on a messaging sub-system, updating status for the previously calculated span, and publish end for the particular span. As another example, persisting a firewall rule may be associated with a task divided into the following events: rule received, time spent running validation of user input, convert user input to domain model, persist domain model data to disk, create audit logs for future reference, and control being returned back to the user. If event parser 114 identifies either a publish beginning event for a span or a rule receipt event, then event parser 114 may instantiate the state machine associated with the firewall publishing task or firewall rule persisting task, respectively.

At step 240, event parser 114 identifies a subsequent event of the task. That is, given the task identified at step 220, event parser 114 identifies a next event that is expected for the task. The state machine instantiated for the task at step 230 verifies that the task is progressing when the next expected event is identified, until a final event is identified indicating that the task has completed. Continuing the firewall publishing example from above, event parser 114 may identify, for the associated task, that an event in which rules are fetched from a persistent datastore occurs after the first event in which the publish begins for a span, and likewise for the subsequent events involving computing an IP list for VM containers used in L3 rules, translating the VM containers in the firewall rule into their respective lists of IP addresses or MAC addresses based on the kind of rule (i.e., L3 or L2), etc.

In one embodiment, each task may include events having strict ordering between them and events having ordering between them that are not strict. The subsequent event that needs to be identified at step 230 may then be strictly the next event or one of a number of permissible next events, as appropriate. Continuing the firewall rule provisioning example from above, there may be a strict ordering between the events associated with the rules being retrieved from the persistent datastore and VM containers being translated into respective IP or MAC lists, whereas the events associated with the IP list being computed, the MAC list being computed, and the VNIC list being computed may not need to occur in a strict order.

As discussed, the tasks themselves, including the events in each task and the (strict or non-strict) ordering of the events may be inherent to event parser 114 or defined through an input, such as properties file 105. Properties file 105 may be written by a user, who understands the events of each task, and fed to event parser 114. Event parser 114 may then use the properties file to identify the initial and subsequent events, as well as their ordering, in each task.

If the next expected event is not in fact found at step 240, then at step 250, the missing event is reported (e.g., via a user interface) as an anomaly. That is, failover conditions are triggered if the next event is not found, as the task has not been completed, and anomalies may be reported in the missing events. If the subsequent event is identified, however, then at step 260, event parser 114 determines whether a final event of the task has been identified. That is, event parser 114 determines whether the event identified at step 240 is the last event in the task, based on the ordering of events associated with the task. Continuing the firewall publishing example from above, event parser 114 may determine whether an event is identified in which publishing ends for the span.

If event parser 114 determines that the final event has not been identified at step 260, then method 200 returns to step 240, where event parser 114 identifies another event of the task. If, on the other hand, event parser 114 determines at step 260 that the final event has been identified, then at step 270, event parser 114 persists information associated with the task in datastore 120 (or another datastore). Such information may include timestamp data, runtime values of variables, and the like obtained from the log messages associated with the task.

At step 280, report generator 116 generates a report based on stored task and event information. Any feasible type of report may be generated and displayed to a user via a UI. For example, report generator 116 may generate a report indicating tasks associated with configuration changes that have been completed. As discussed, the specific information provided in logs messages may be used to correlate identified events and tasks with configuration changes made by a user in the management plane to determine whether those changes have been realized in the data plane. As a result, the user may be informed of which configuration changes made in the management plane have been realized in the data plane. As another example, a report may be generated with charts showing the time taken to realize a particular type of configuration change, based on the time taken to complete the associated task, over a period of time.

Figure 3:
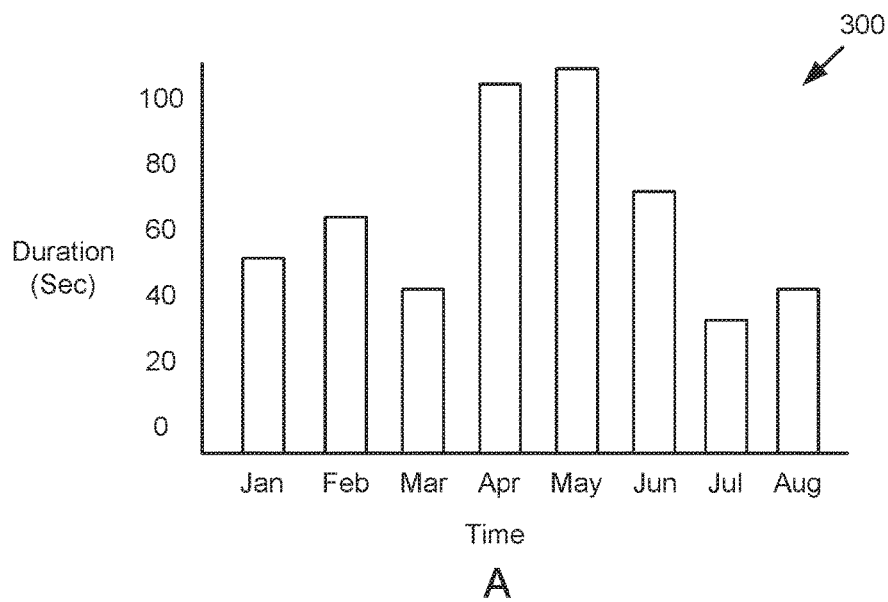
FIG. 3 illustrates examples of reports generated according to the method of FIG. 2, according to an embodiment.
Figure 3:
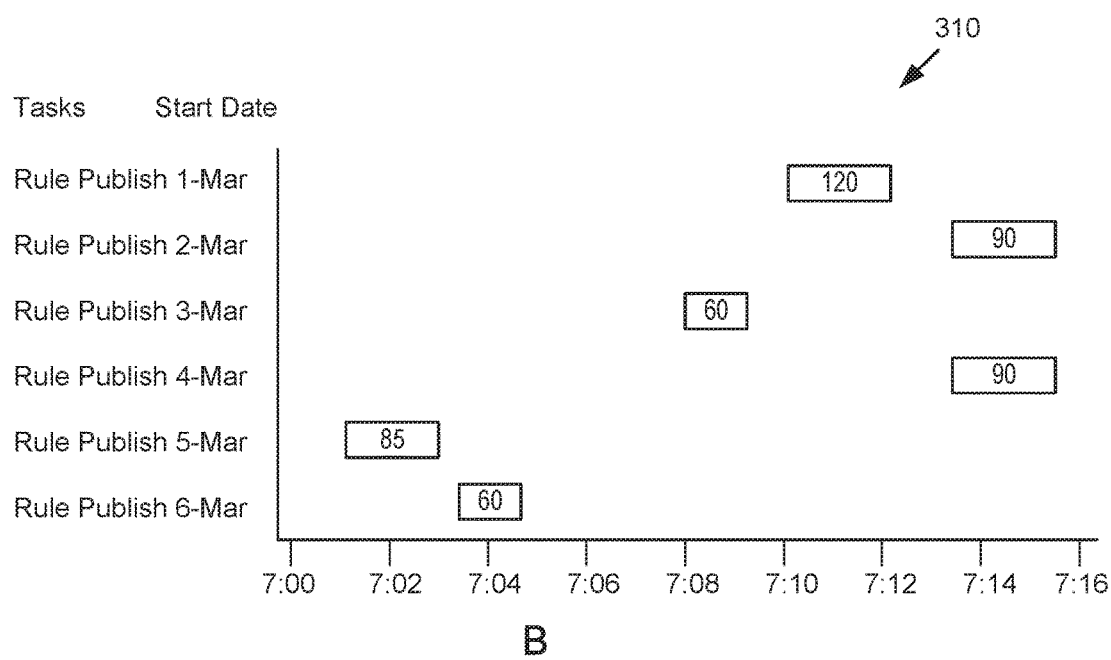

FIG. 3 illustrates examples of reports that may be generated and displayed to a user via a UI, according to an embodiment. Panel A of the UI shows a report 300 which includes a chart of the time taken to publish logical firewall rules on a cluster of host servers ("Cluster A") over a period of time. Panel B of the UI shows a report 310 which includes a chart of task completion times in a particular week. As discussed, reports such as reports 300 and 310 may be generated based on events and task data, including the times associated therewith, that is obtained via method 200 and persisted in datastore 120. Reports such as reports 300 and 310 allow a user to figure out the times taken to realize configuration changes and how such times vary over time. As a result, the user may be able to identify anomalies such as an unusually long time for realizing a type of configuration change and diagnose any problems that may be causing the long realization time.

Figure 4:
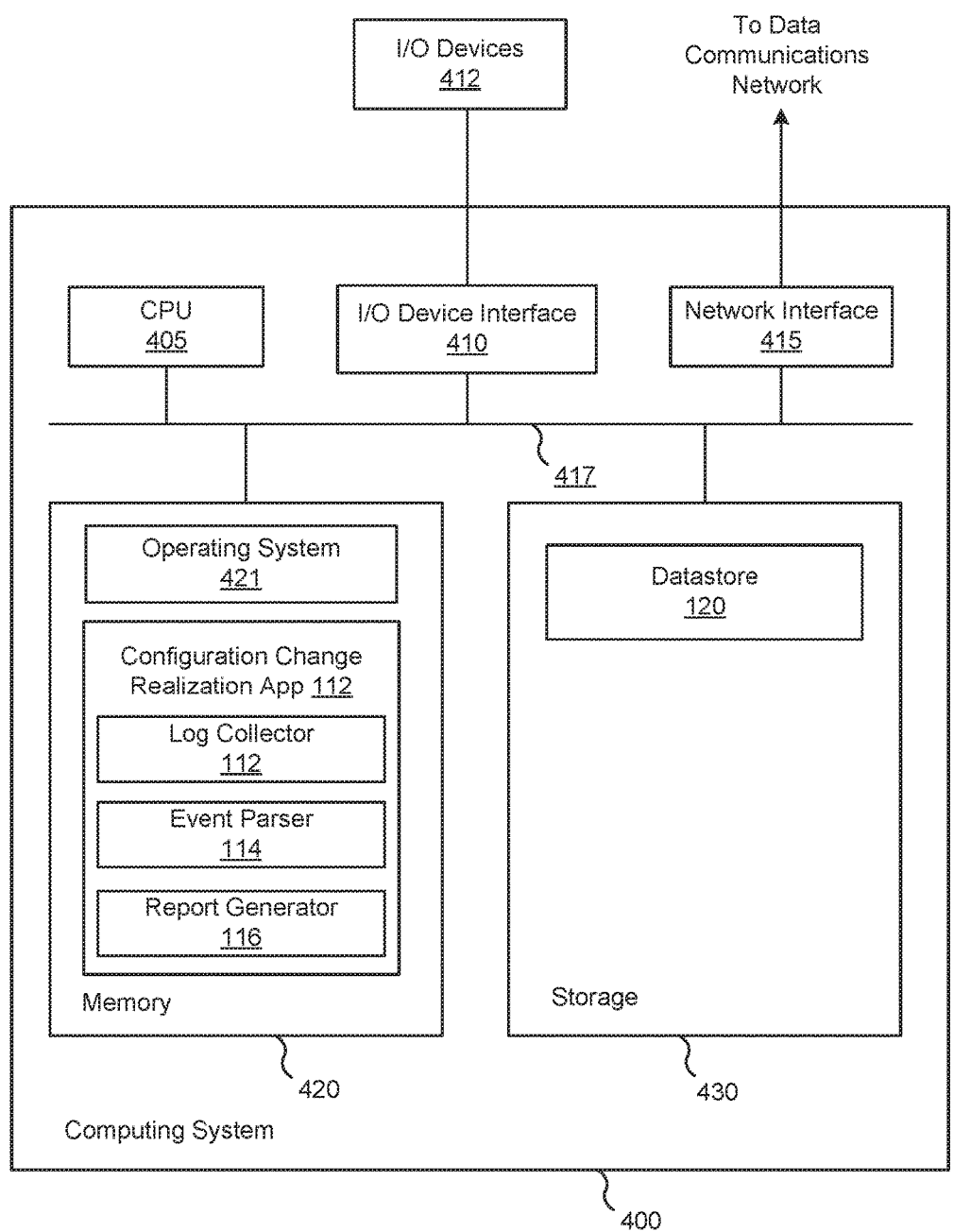
FIG. 4 illustrates a computer system in which a configuration change realization assessment application may be implemented, according to an embodiment.

FIG. 4 illustrates a computer system 400 in which configuration change realization assessment application 110 may be implemented, according to an embodiment. As shown, system 400 includes a central processing unit (CPU) 405, a network interface 415 connecting system 400 to a network, an interconnect 417, a memory 420, and storage 430. System 400 may also include an I/O device interface 410 connecting I/O devices 412 (e.g., keyboard, display and mouse devices) to system 400.

CPU 405 retrieves and executes programming instructions stored in memory 420. Similarly, CPU 405 stores and retrieves application data residing in memory 420. Interconnect 417 facilitates transmission, such as of programming instructions and application data, between CPU 405, I/O device interface 410, storage 430, network interface 415, and memory 420. CPU 405 is included to be representative of a single CPU, multiple CPUs, a single CPU having multiple processing cores, and the like. And memory 420 is generally included to be representative of a random access memory. Storage 430 may be a disk drive storage device. Although shown as a single unit, storage 430 may be a combination of fixed and/or removable storage devices, such as magnetic disk drives, flash drives, removable memory cards or optical storage, network attached storage (NAS), or a storage area-network (SAN). Further, system 400 is included to be representative of a physical computing system as well as virtual machine instances hosted on a set of underlying physical computing systems. Further still, although shown as a single computing system, one of ordinary skill in the art will recognized that the components of system 400 shown in FIG. 4 may be distributed across multiple computing systems connected by a data communications network.

As shown, memory 420 includes an operating system 421 and configuration change realization assessment application 110. Illustratively, operating system 421 may include Linux®. Configuration change realization assessment application 110 includes log collector 112, event parser 114, and report generator 116, which as discussed are configured to collect system log data (e.g., from host servers $150_{1-N}$ and logical firewall manager application 140); parse the log data to identify events and determine whether tasks have been completed; and generating reports on realized configuration changes associated with completed tasks, time taken to realize the configuration changes, timelines of events and other details in configuration change realization, etc., respectively. In one embodiment, event parser 114 may identify events and persist the same in datastore 120, identify a first event of a task, instantiate a state machine associated with the task, identify subsequent event(s) of the task, determine whether a final event of the task has been identified; and if a final event has been identified, persist information associated with the task in datastore 120, according to method 200, discussed above.

Advantageously, techniques disclosed herein assess configuration change realization in a system based on whether events of tasks associated with such realization occur in an expected order in log(s) collected from the system. As a result, a user making configuration changes is able to identify whether those changes have been realized through the performance of associated tasks and events therein. Reports may be generated showing the realization of configuration changes, timelines of events and other details in configuration change realization, time taken to realize configuration changes over time, and the like.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A method of assessing configuration change realization in a datacenter comprising a plurality of host machines, each host machine running a virtualization software layer and one or more virtual computing instances, the method comprising:
   receiving, at a computing device separate from the plurality of host machines, log messages from the plurality of host machines;
   parsing the log messages received from the plurality of host machines at the computing device and not at each of the plurality of host machines so that computing resources of the computing device and not of each of the plurality of host machines are used for parsing the log messages thereby improving performance of the plurality of host machines for performing other computing tasks;
   identifying from the parsing of the log messages a first event, the first event being associated with a task that corresponds with a configuration change being made to one or more of the plurality of host machines, and the task including subsequent events that are expected to occur after the first event;
   identifying from the parsing each of the subsequent events of the task; and
   when each of the subsequent events of the task are identified from the parsing of the log messages, generating a report which indicates a realization of the configuration change associated with the task.

2. The method of claim 1, wherein
   the configuration change is propagated to and made in one or more hypervisors running on the one or more of the plurality of host machines.

3. The method of claim 2, wherein the configuration change includes at least one of publishing a logical firewall and persisting a firewall rule.

4. The method of claim 3, wherein the log messages are collected from the one or more hypervisors and from an application used to manage the logical firewall.

5. The method of claim 1, wherein the task, first event and subsequent events of the task, and an order of the first event and subsequent events are specified in a properties file.

6. The method of claim 1, wherein an order of the first event and subsequent events of the task includes a strict ordering between a first plurality of events of the task and a non-strict ordering between a second plurality of events of the task.

7. The method of claim 1, wherein
   parsing the log messages includes determining a time when each of the first event and subsequent events occurred, and
   the generated report further indicates at least one of a time duration taken to realize the configuration change and a timeline of the first event and subsequent events.

8. The method of claim 1, wherein the generated report further indicates configuration change realization times over time.

9. A non-transitory computer-readable storage medium containing a program which, when executed by one or more processors, performs operations for assessing configuration change realization in a datacenter comprising a plurality of host machines, each host machine running a virtualization software layer and one or more virtual computing instances, the operations comprising:
receiving, at a computing device separate from the plurality of host machines, log messages from the plurality of host machines;
parsing the log messages received from the plurality of host machines at the computing device and not at each of the plurality of host machines so that computing resources of the computing device and not of each of the plurality of host machines are used for parsing the log messages thereby improving performance of the plurality of host machines for performing other computing tasks;
identifying from the parsing of the log messages a first event, the first event being associated with a task that corresponds with a configuration change being made to one or more of the plurality of host machines, and the task including subsequent events that are expected to occur after the first event;
identifying from the parsing each of the subsequent events of the task; and
when each of the subsequent events of the task are identified from the parsing of the log messages, generating a report which indicates a realization of the configuration change associated with the task.

10. The non-transitory computer-readable storage medium of claim 9, wherein
the configuration change is propagated to and made in one or more hypervisors running on the one or more of the plurality of host machines.

11. The non-transitory computer-readable storage medium of claim 10, wherein the configuration change includes at least one of publishing a logical firewall and persisting a firewall rule.

12. The non-transitory computer-readable storage medium of claim 11, wherein the log messages are collected from the one or more hypervisors and from an application used to manage the logical firewall.

13. The non-transitory computer-readable storage medium of claim 9, wherein the task, first event and subsequent events of the task, and an order of the first event and subsequent events are specified in a properties file.

14. The non-transitory computer-readable storage medium of claim 9, wherein an order of the first event and subsequent events of the task includes a strict ordering between a first plurality of events of the task and a non-strict ordering between a second plurality of events of the task.

15. The non-transitory computer-readable storage medium of claim 9, wherein
parsing the log messages includes determining a time when each of the first event and subsequent events occurred, and
the generated report further indicates at least one of a time duration taken to realize the configuration change and a timeline of the first event and subsequent events.

16. The non-transitory computer-readable storage medium of claim 9, wherein the generated report further indicates configuration change realization times over time.

17. A computing device, comprising:
a processor; and
a memory, wherein the memory includes a program executable in the processor to perform operations for assessing configuration change realization in a datacenter comprising a plurality of host machines, each host machine running a virtualization software layer and one or more virtual computing instances, the operations comprising:
receiving, at the computing device separate from the plurality of host machines, log messages from the plurality of host machines;
parsing the log messages received from the plurality of host machines at the computing device and not at each of the plurality of host machines so that computing resources of the computing device and not of each of the plurality of host machines are used for parsing the log messages thereby improving performance of the plurality of host machines for performing other computing tasks;
identifying from the parsing of the log messages a first event, the first event being associated with a task that corresponds with a configuration change being made to one or more of the plurality of host machines, and the task including subsequent events that are expected to occur after the first event;
identifying from the parsing each of the subsequent events of the task; and
when each of the subsequent events of the task are identified from the parsing of the log messages, generating a report which indicates a realization of the configuration change associated with the task.

18. The computing device of claim 17, wherein
the configuration change is propagated to and made in one or more hypervisors running on the one or more of the plurality of host machines.

19. The computing device of claim 18, wherein the configuration change includes at least one of publishing a logical firewall and persisting a firewall rule.

20. The computing device of claim 17, wherein an order of the first event and subsequent events of the task includes a strict ordering between a first plurality of events of the task and a non-strict ordering between a second plurality of events of the task.

* * * * *